(12) United States Patent
Aguirre et al.

(10) Patent No.: US 12,442,666 B2
(45) Date of Patent: Oct. 14, 2025

(54) ADAPTIVE COIL DRIVER FOR INDUCTIVE SENSORS

(71) Applicant: Allegro MicroSystems, LLC, Manchester, NH (US)

(72) Inventors: Pablo Aguirre, Montevideo (UY); Hernán D. Romero, Buenos Aires (AR)

(73) Assignee: Allegro MicroSystems, LLC, Manchester, NH (US)

( * ) Notice: Subject to any disclaimer, the term of this patent is extended or adjusted under 35 U.S.C. 154(b) by 254 days.

(21) Appl. No.: 18/318,029

(22) Filed: May 16, 2023

(65) Prior Publication Data

US 2024/0385015 A1    Nov. 21, 2024

(51) Int. Cl.
  *G01D 5/20*    (2006.01)
  *G01B 7/30*    (2006.01)

(52) U.S. Cl.
  CPC ........ *G01D 5/20* (2013.01); *G01B 7/30* (2013.01)

(58) Field of Classification Search
  CPC ................................... G01D 5/20; G01B 7/30
  See application file for complete search history.

(56) References Cited

U.S. PATENT DOCUMENTS

| | | | |
|---|---|---|---|
| 6,967,574 B1 * | 11/2005 | Nelson | F41H 11/16 340/552 |
| 8,453,518 B2 | 6/2013 | Diekmann et al. | |
| 9,983,045 B2 | 5/2018 | O'Neill | |
| 10,330,499 B2 | 6/2019 | Elliott et al. | |
| 10,823,789 B2 | 11/2020 | Rossi et al. | |
| 11,079,291 B2 | 8/2021 | Bertin | |
| 11,112,275 B2 | 9/2021 | Bertin | |
| 11,408,755 B2 | 8/2022 | Bertin | |
| 11,428,755 B2 | 8/2022 | Latham et al. | |
| 11,994,387 B2 * | 5/2024 | Rasbornig | G01D 5/2046 |

OTHER PUBLICATIONS

U.S. Appl. No. 18/051,934, filed Nov. 2, 2022, Romero et al.
U.S. Appl. No. 18/148,517, filed Dec. 30, 2022, Lehndorff.

* cited by examiner

*Primary Examiner* — Reena Aurora
(74) *Attorney, Agent, or Firm* — Daly, Crowley, Mofford & Durkee, LLP

(57) ABSTRACT

In one example, an inductive sensor interface circuit includes: a coil driver configured to excite one or more transmit coils to generate a magnetic field at a target; a plurality of input channels for receiving input signals via respective ones of a plurality of receive coils, the input signals responsive to reflections of the magnetic field off the target and encoding information about a position of the target; a position detection processor to decode the information about the position of the target from the input signals; and an amplitude detection processor configured to calculate an amplitude of the input signals and to control a strength of the magnetic field generated by the coil driver based on a difference between the calculated amplitude to a predetermined desired input amplitude.

17 Claims, 5 Drawing Sheets

400

```
┌─────────────────────────────────────────────┐
│ Excite one or more transmit coils to generate│
│         a magnetic field at a target         │
│                     402                      │
└─────────────────────────────────────────────┘
                       │
                       ▼
┌─────────────────────────────────────────────┐
│ Receive input signals via respective receive coils,│
│ the input signals responsive to reflections of the │
│   magnetic field off the target and encoding │
│    information about a position of the target│
│                     404                      │
└─────────────────────────────────────────────┘
                       │
                       ▼
┌─────────────────────────────────────────────┐
│ Optionally decode the information about the position│
│    of the target from the input signals     │
│                     406                      │
└─────────────────────────────────────────────┘
                       │
                       ▼
┌─────────────────────────────────────────────┐
│    Calculate an amplitude of the input signals│
│                     408                      │
└─────────────────────────────────────────────┘
                       │
                       ▼
┌─────────────────────────────────────────────┐
│  Calculate a difference between the amplitude of the│
│    input signals and a desired input amplitude│
│                     410                      │
└─────────────────────────────────────────────┘
                       │
                       ▼
┌─────────────────────────────────────────────┐
│  Adjust a strength of the magnetic field based on the│
│            calculated difference             │
│                     412                      │
└─────────────────────────────────────────────┘
```

*FIG. 4*

ADAPTIVE COIL DRIVER FOR INDUCTIVE SENSORS

BACKGROUND

Real-time position monitoring of movable objects is desirable in many applications. Examples include but are not limited to industrial manufacturing, automotive, and robotics applications. Some known positioning techniques include use of reflected magnetic fields to indicate position of a movable object, or "target," that is typically part of or connected to a movable component of a mechanical system. For such techniques, often referred to as "inductive" position sensing, a magnetic field is typically directed to and subsequently reflected from the target, with the reflected magnetic field including information about the position or motion of the target.

Inductive positioning techniques can use an inductive interface circuit (IICs) to extract and condition electrical signals originating from one or more pick-up coils, acting as a receiver to detect the reflected magnetic field. In some applications, one or more emitting coils (or "transmit coils" or "TX coils") may be excited to emit a magnetic field, which is reflected off and modulated by the movable target and received by the pick-up coils ("receive coils" or "RX coils"). The RX coils can convert the modulated field-which may be carrying information associated with a position of the target-into one or more electrical signals that are input to the IIC for processing. The IIC can include analog and digital circuitry to demodulate, condition, and/or otherwise process the input signals to determine a position (e.g., angular position) of the target being interrogated.

SUMMARY

An IIC may include a coil driver configured to generate an electrical signal at a particular carrier frequency used to excite (or "drive") a TX coil (or coils). The TX coil(s) may form a part of an LC tank circuit (along with one or more capacitors) designed to achieve a particular resonance. The coil driver compensates for losses of the LC tank.

To determine the position of a target, the emitted magnetic field must have sufficient strength to permit the RX coils to pick up the target reflections and to permit the IIC to process the resulting input signal(s) with a resolution required/specified for the system in which it is deployed. Thus, for example, the coil driver can excite the TX coil so as to set an amplitude to produce a sufficiently strong field. The amplitude of the modulated electrical signal(s) received as input to the IIC is a function of the current through the TX coil, the air gap between the coils and the target, and the design of both the TX and RX coils in terms of inductance value, quality factor, etc.

In any front-end acquisition circuit, there is a minimum input signal amplitude required to achieve a resolution specified for the system in which it is deployed. An increase in input signal amplitude beyond this will generally improve resolution, but may degrade system linearity and thus accuracy.

With conventional inductive sensors, the TX coil are typically driven at a fixed amplitude defined by the maximum voltage swing that the coil driver in the IIC can achieve. While this approach generally maximizes magnetic field strength, the resulting input signal amplitude may be highly sensitive to variations in coil design and coil-target air gap. Designing the acquisition circuit within a conventional IIC to handle a wide range of input amplitudes can result in inconvenient tradeoffs between power consumption, resolution and linearity. In addition, this conventional approach tends to over-drive the TX coil in terms of the magnetic field strength necessary to produce the minimum input signal amplitude, resulting in wasted power and excess electromagnetic emissions.

Disclosed herein are structures and techniques for automatically adjusting the amplitude of excitation signals generated by a coil driver such that resulting input signals to an IIC have an amplitude that is substantially equal to a predetermined input signal amplitude, referred to herein as the "desired input amplitude." In some cases, the desired input amplitude may be defined in terms of the minimum input signal amplitude of the IIC's front-end circuitry. Disclosed embodiments control the coil driver based on the amplitude of signals present on the RX coils using a feedback loop between the receive and transmit sides of the IIC. This results in more efficient use of current used to drive the LC tank circuit and reduced electromagnetic emissions. In addition, disclosed structures and techniques allow the IIC's front-end acquisition circuit to be optimized to achieve specified resolutions and accuracies across a broad range of system designs (e.g., coil designs, resonant frequencies, air gaps, target geometries and materials, etc.) while compensating for variable environmental conditions (e.g., temperature) and lifetime drift of system components.

According to one aspect of the present disclosure, an inductive sensor interface circuit can include: a coil driver configured to excite one or more transmit coils to generate a magnetic field at a target; a plurality of input channels for receiving input signals via respective ones of a plurality of receive coils, the input signals responsive to reflections of the magnetic field off the target and encoding information about a position of the target; a position detection processor to decode the information about the position of the target from the input signals; and an amplitude detection processor configured to calculate an amplitude of the input signals and to control a strength of the magnetic field generated by the coil driver based on a difference between the calculated amplitude to a predetermined desired input amplitude.

In some embodiments, the plurality of input channels may include a first channel for receiving a first input signal and a second channel for receiving a second input signal 90° out of phase with the first input signal. In some embodiments, the calculating of the amplitude of the input signals can include calculating a magnitude of a vector representing both an amplitude of the first input signal and an amplitude of the second input signal. In some embodiments, the vector may also be used by the position detection processor to decode the information about the position of the target. In some embodiments, the target is provided as a rotary target and the position of the target corresponds to an angular position.

In some embodiments, at least one of the input channels in the plurality of channels can include a demodulator for demodulating the respective input signal. In some embodiments, at least one of the input channels in the plurality of channels may include an amplifier for amplifying the respective input signal. In some embodiments, at least one of the input channels in the plurality of channels can include a filter for filtering the respective input signal. In some embodiments, the amplitude detection processor can be coupled to the coil driver in a feedback loop.

In some embodiments, the circuit may be provided as an integrated circuit (IC). In some embodiments, the one or more transmit coils and the one or receive coils can be external to the IC.

In some embodiments, the amplitude detection processor can be configured to control the strength of the magnetic field generated by the coil driver by: calculating a difference between the calculated amplitude and the predetermined desired input amplitude; and generating an error signal responsive to said difference, wherein the error signal is fed back to the coil driver. In some embodiments, the predetermined desired input amplitude can be selected based on a minimum input signal amplitude of the plurality of channels.

According to another aspect of the present disclosure, a method can include: exciting one or more transmit coils to generate a magnetic field at a target; receiving a plurality of input signals via respective ones of a plurality of receive coils, the input signals responsive to reflections of the magnetic field off the target and encoding information about a position of the target; decoding the information about the position of the target from the input signals; calculating an amplitude of the input signals; calculating a difference between the amplitude of the input signals and a predetermined desired input amplitude; and adjust a strength of the magnetic field based on the difference.

In some embodiments, the plurality of input signals can include a first input signal and a second input signal 90° out of phase with the first input signal. In some embodiments, the calculating of the amplitude of the input signals may include calculating a magnitude of a vector representing both an amplitude of the first input signal and an amplitude of the second input signal. In some embodiments, the vector may also be used to decode the information about the position of the target from the input signals.

In some embodiments, the target can be provided as a rotary target and the position of the target corresponds to an angular position. In some embodiments, the method can further include demodulating, amplifying, and/or filtering each of the plurality of input signals. In some embodiments, adjusting the strength of the magnetic field based on the difference can include generating an error signal responsive to said difference, wherein the error signal is fed back to a coil driver configured to excite the transmit coils.

According to another aspect of the present disclosure, a system can include: a means for exciting one or more transmit coils to generate a magnetic field at a target; a means for receiving one or more input signals responsive to the magnetic field reflected off the target; and a means for controlling a strength of the magnetic field that amplitude of the one or more input signals is substantially equal to a predetermined desired input amplitude.

It should be appreciated that individual elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the following claims.

BRIEF DESCRIPTION OF THE DRAWINGS

The manner of making and using the disclosed subject matter may be appreciated by reference to the detailed description in connection with the drawings, in which like reference numerals identify like elements.

FIG. 4 is flow diagram showing a process for adaptive driving of transmit coils in an inductive sensor, according to some embodiments of the present disclosure.

The drawings are not necessarily to scale, or inclusive of all elements of a system, emphasis instead generally being placed upon illustrating the concepts, structures, and techniques sought to be protected herein.

DETAILED DESCRIPTION

Figure 1:
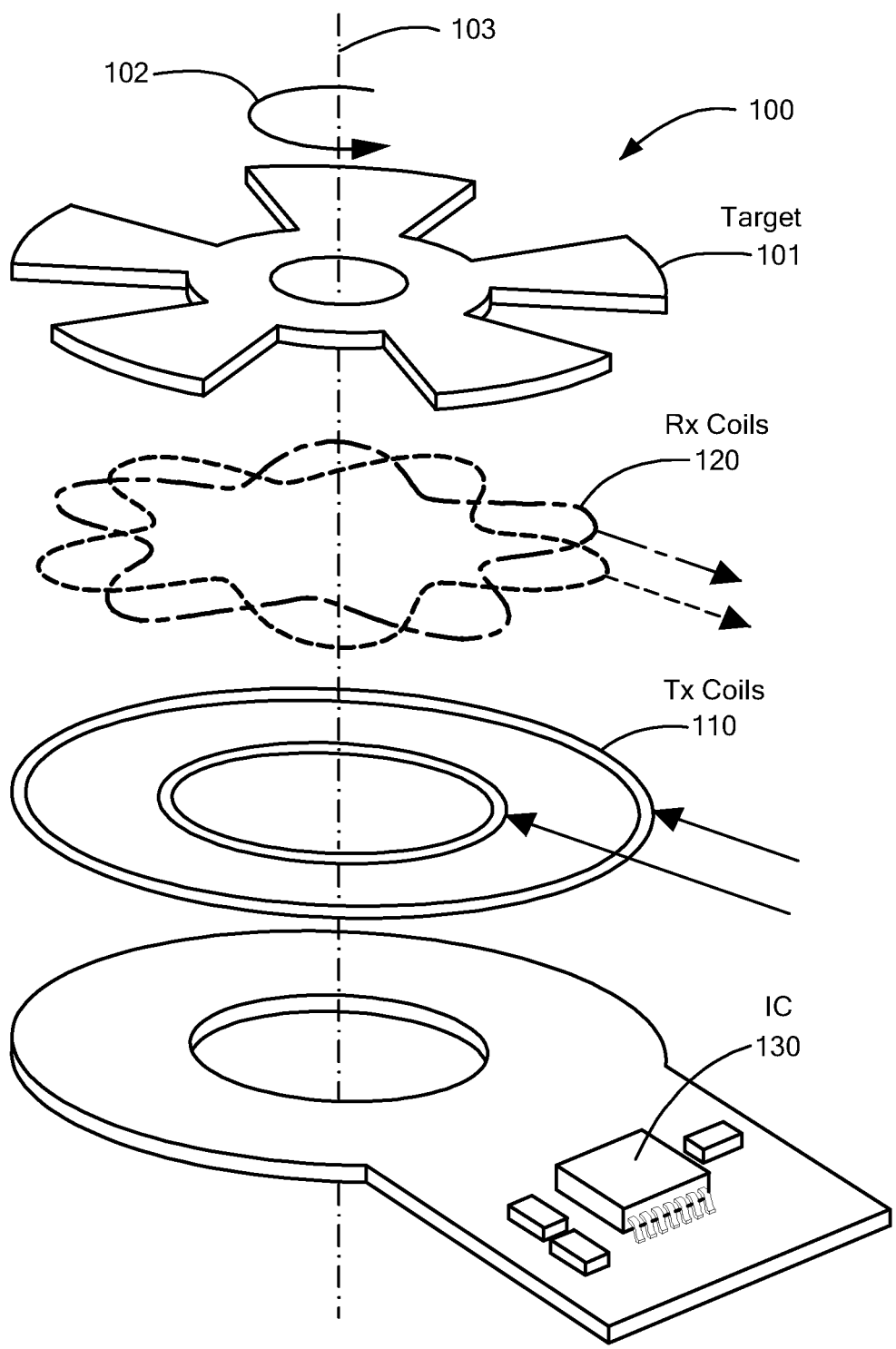
FIG. 1 is an exploded view of a rotary encoder in which embodiments of the present disclosure may be employed.

FIG. 1 shows a rotary encoder 100 (sometimes referred to as an inductive sensor) used with a representative inductive interface circuit (IIC) 130. Rotary encoder 100 includes one or more transmit (TX) coils 110 (two are shown) and one or more receive (RX) coils 120 (two are shown) that are positioned in proximity to a movable target 101. The number and arrangement of coils shown in FIG. 1 are merely illustrative and other configurations may be used. As shown, movable target 101 can be a rotary target having a direction of rotation 102 about an axis of rotation 103. The IIC 130 can be connected to TX coils 110 and RX coils 120, although such connections are not explicitly shown in the exploded view of FIG. 1.

IIC 130 can include a coil driver configured to excite the TX coils 110 to emit a magnetic field (sometimes referred to as an interrogation field) directed to target 101. In some cases, the coil driver may utilize one or more capacitors to achieve resonance to maximize efficiency and minimize power consumption. The frequency of such sinusoidal oscillation is the carrier frequency, $f_{CARRIER}$. The target 101 may be comprised of a conductive material that reflects the emitted magnetic field onto the RX coils 120. As shown, in some applications, the RX coils 120 can be arranged such they detect the reflected magnetic field with 90 degrees of phase difference (i.e., in quadrature). Consequently, in-phase and quadrature (I/Q) electrical signals are generated by the two RX coils 120. In any case, the RX coils 120 generate signals that are modulated around the carrier frequency, $f_{CARRIER}$, to encode information about the target's position (e.g., rotation angle). These signals may then be input to and conditioned by the IIC 130 for calculating a position (e.g., angle) of the target 101. In some cases, the IIC 130 may include two or more input channels, each to receive a separate RX coil signal.

TX coils 110 and/or RX coils 120 may be formed as conductive traces on a printed circuit board (PCB). IIC 130 may be provided as an integrated circuit (IC) that is attached (e.g., soldered) to the PCB. During final assembly, the PCB assembly can be mounted or otherwise positioned in proximity to the rotatable target 101. The distance between the coils 110, 120 and the target 101 is referred to as the air gap.

As previously discussed, the amplitude of the modulated signals generated by RX coils depends not only on the amplitude of signals used to excite the TX coils, but also on the air gap and coil design. Thus, an IIC design that is utilized across many different systems with varying air gaps and coil designs can experience a large voltage swing at the RX coils. Conventional IICs drive the TX coils at a fixed voltage, which may lead to over-driving of the coils in terms of the magnetic field strength required to inductively sense the target's position. This fixed voltage is typically set on the IIC prior to assembly, preventing it from being calibrated on a system-by-system basis (the precise air gap is not known until final assembly).

Referring again to FIG. 1, according to some embodiments of the present disclosure, IIC 130 may be configured to automatically adjust the amplitude of the TX coil 110 excitation signals such that resulting signals generated by the RX coils 120 have an amplitude that is substantially equal to a predetermined desired input amplitude. Thus, IIC 130 may be described as having an adaptive coil driver. In some embodiments, IIC 130 may have a design that is the same as or similar to that shown below in the context of FIG. 3.

While FIG. 1 shows an example of detecting position of a rotating target, embodiments of the present disclosure can be used to detect position of other types of targets, including targets having linear motion (i.e., displacement along one or more axes with respect to coils 110, 110) and stationary targets.

Figure 2:
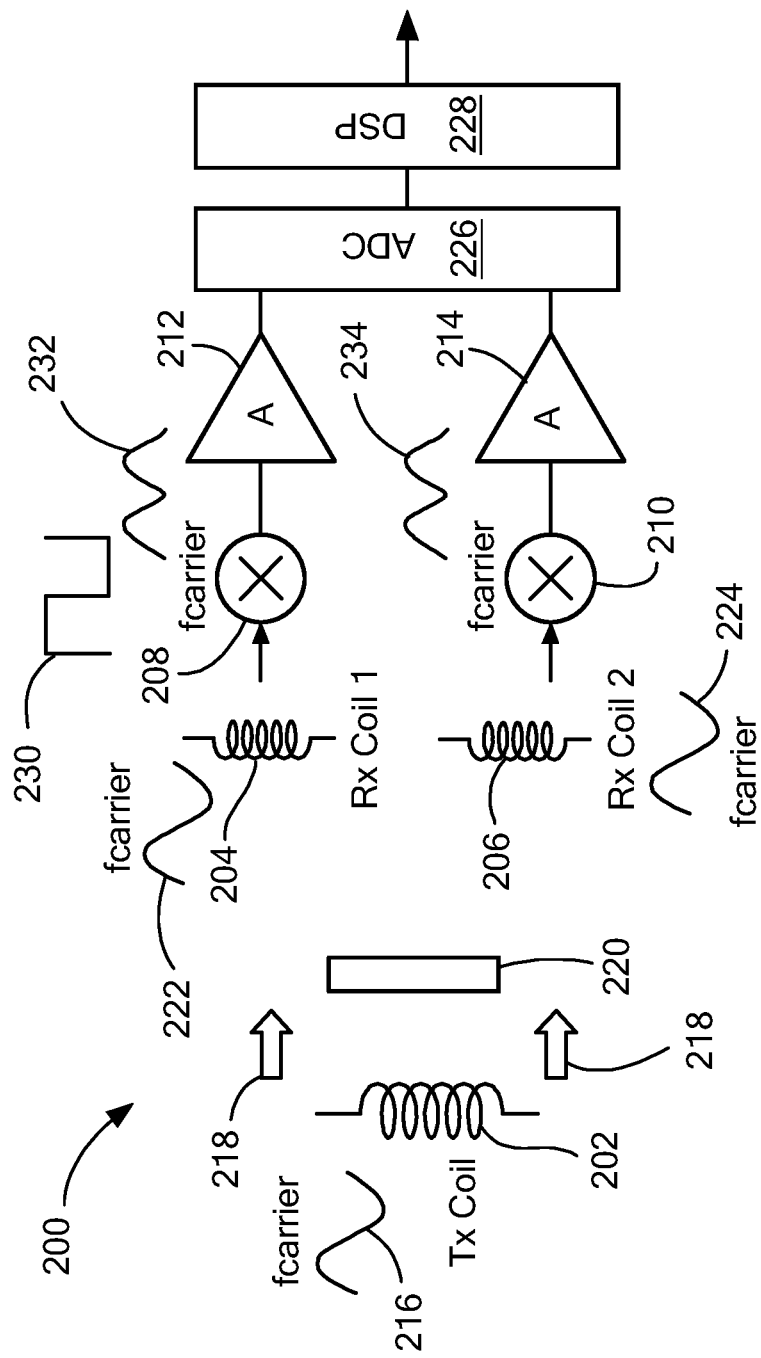
FIG. 2 is a schematic diagram showing a conventional inductive interface circuit (IIC).

FIG. 2 shows a conventional IIC 200 coupled to a TX coil 202 and RX (or "pick-up") coils 204, 206. The IIC 200 can include demodulators 208, 210 and amplifiers 212, 214 and a coil driver (not shown). In operation, the coil driver generates a signal 216 with carrier frequency ($f_{CARRIER}$) to excite TX coil 202 to emit magnetic field 218, also with carrier frequency ($f_{CARRIER}$). Magnetic field 218 is directed to, and reflected off a target 220, as illustrated by reflected fields 222, 224. RX coils 204, 206 receive the reflected fields 222, 224 providing corresponding input signals to demodulators 208, 210 of the IIC 200. IIC 200 also includes an analog-to-digital converter (ADC) 226 and a digital signal processor (DSP) 228 configured to determine position of the target 220.

An in-phase (coherent) signal 230, typically generated on-chip (i.e., within the same IC package that IIC 200 is realized), may be used for the demodulation. When multiplying the signal 230 by an input signal received from one of the RX coils 204, 206, rectified-sinusoidal signals 232, 234 can be generated. Position information of the target 220 is encoded in the amplitude of each input signal and, thus, after demodulation, is also encoded in the low frequency content of the rectified sinusoidal signals 232, 234.

In the example of FIG. 2, square-wave demodulation (SWD) is used to decode information about the target's position. SWD is merely one type of demodulation that may be used within an inductive sensor, and the techniques and structures sought to be protected herein are not limited to any demodulation scheme.

Of note, with conventional IIC 200, TX coil 202 may be driven at a fixed amplitude to produce a fixed-strength magnetic field 218, irrespective of the air gap between the coils 202, 204, 206 and the target 220 or the design of these coils. This can result in the TX coil 202 being under-driven or over-driven in terms of the minimum acceptable input signal amplitude needed to guarantee a specific resolution (e.g., a resolution specified by the system in which IIC 200 is deployed). As previously discussed, an increase in signal amplitude can degrade system linearity and thus accuracy.

Figure 3:
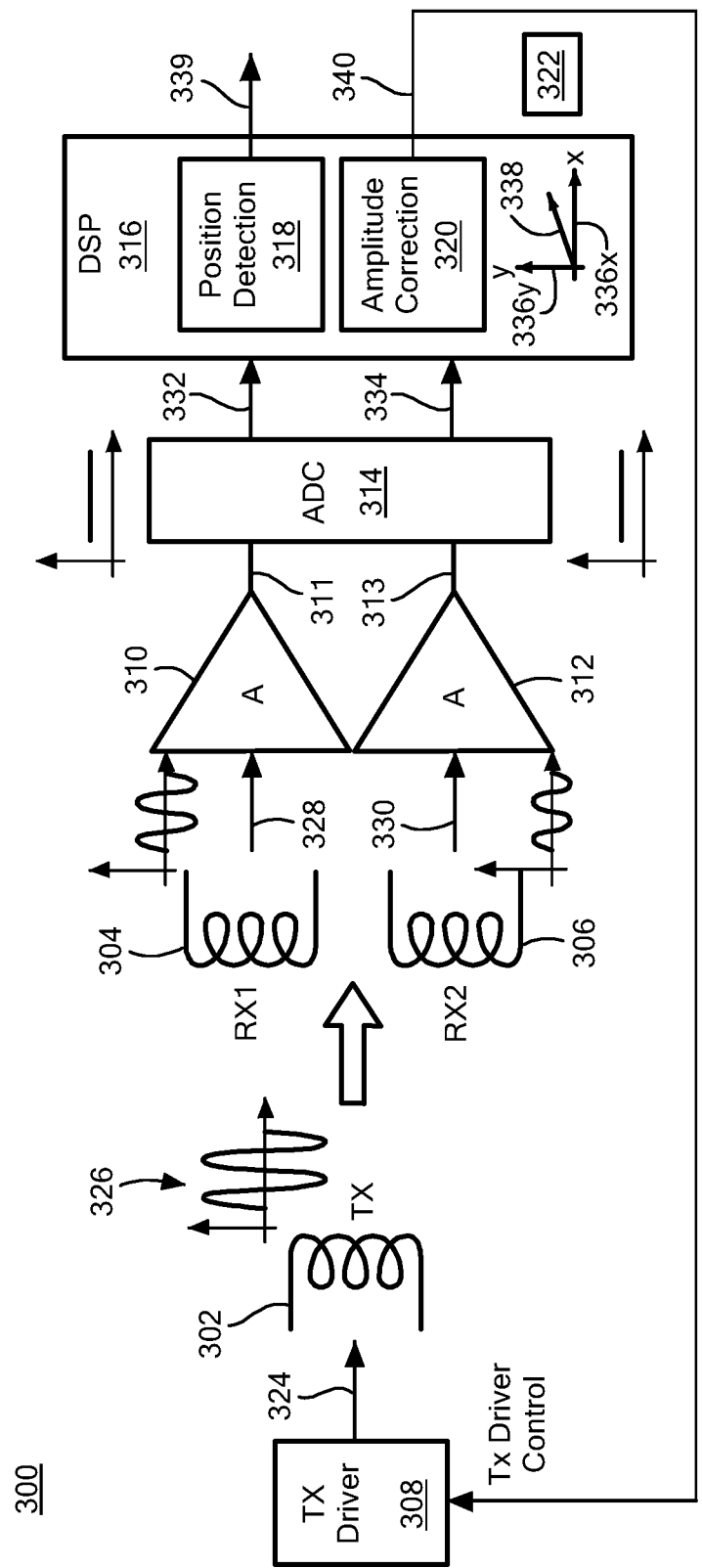
FIG. 3 is a diagram showing an example of an IIC with an adaptive coil driver, according to some embodiments of the present disclosure.

Turning to FIG. 3, disclosed embodiments provide for improved IICs using a closed-loop architecture to drive the TX coils with only the current necessary to generate a specified input signal amplitude picked up by the RX coils. That is, a feedback loop may be used to control the TX coil driver in order to generate and keep a predetermined desired input amplitude for the input signals, regardless of changes in the environmental conditions and lifetime drifts of the system components (e.g., IC, external tank, etc.), thereby providing for improved efficiency and linearity/accuracy.

FIG. 3 shows an adaptive coil driver IIC 300, according to some embodiments of the present disclosure, electrically coupled to one or more TX coils 302 and one or more RX coils 304, 306. Illustrative IIC 300 includes a transmit side comprising a coil driver 308 and a receive side comprising conditioning circuits 310, 312, an analog-to-digital converter (ADC) 314, and a digital signal processor (DSP) 316.

Figure 3A:
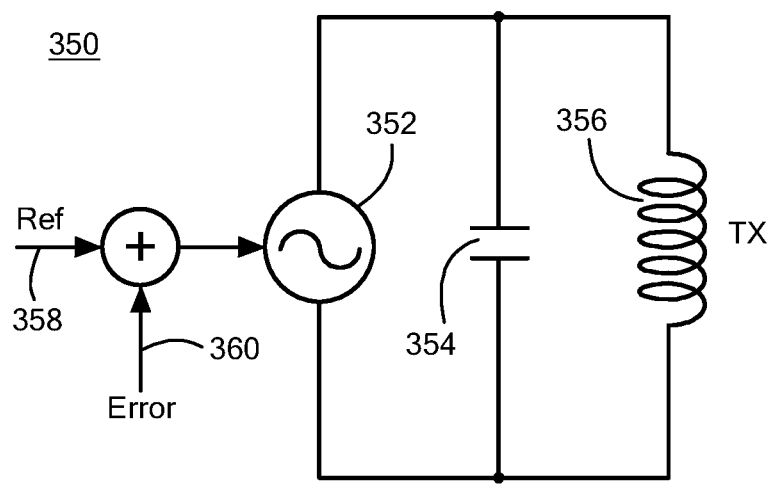
FIG. 3A is a diagram showing an adaptive coil driver connected to transmit coil forming an LC tank circuit, according to some embodiments of the present disclosure.

Coil driver 308 can generate a signal 324 with carrier frequency ($f_{CARRIER}$) to excite the TX coil(s) 302 to emit magnetic field 326. Magnetic field 326 can be directed to and reflected off a moving target (not shown in FIG. 3, but which may be similar to target 101 of FIG. 1). Coil driver 308 may be provided as an adaptive coil driver that can adjust the amplitude of excitation signal 324 and, thus, the strength of magnetic field 326 in response to an external control signal, as discussed further below. FIG. 3A shows an implementation of an adaptive coil driver that may be used within IIC 300.

RX coils 304, 306 can receive the target reflections and, in response, generate modulated input signals 328, 330 to the IIC 300. The target reflections are modulated by the movable target and, as a result, input signals 328, 330 encode information associated with a position (e.g., angle) of the target. The amplitude of input signals 328, 330 is a function of the strength of magnetic field 326, the air gap between the coils 302, 304, 306 and the target, as well as the design of these coils. The RX coils 304, 306 may be arranged such they detect the reflected magnetic field with 90 degrees of phase difference such that input signals 328, 330 are I/Q signals.

IIC 300 may receive and condition input signals 328, 330 separately in two input channels. In more detail, first conditioning circuit 310 may be coupled to receive a first input signal 328 from first RX coil 304, and second conditioning circuit 312 may be coupled to receive a second input signal 330 from second RX coil 306. Each of the conditioning circuits 310, 312 (represented in FIG. 3 simply as amplifier, A, blocks) can include one or more analog circuit elements for demodulating/rectifying, amplifying, and/or filtering the input signals 328, 330 to produce respective baseband signals 311, 313. Various demodulation schemes may be used, including but not limited to SWD as described in the context of FIG. 2. For example, sinusoidal demodulation (using an analog multiplier) may be used. As another example, a pseudo-sinusoidal (or "near" sinusoidal) demodulation approach may be used.

ADC can convert baseband signals 311, 313 to digital I/Q signals 332, 334 for processing by DSP 316. The amplitudes of digital I/Q signals 332, 334 can collectively represent a position of the target as a two-dimensional vector. For example, as illustrated in FIG. 3, amplitude of first (e.g., in-phase) digital signal 332 can represent a point along an x-axis 336*x* and amplitude of second (e.g., quadrature) digital signal 334 can represent a point along a y-axis 336*y*, forming a vector 338. The direction and/or magnitude ("modulus") of vector 338 may be used to determine a position of the target. For example, in the case of a rotatable target, the vector's direction may represent the target's angle of rotation. In some cases, the vector's magnitude may convey target position information (e.g., linear position).

DSP 316 can include a position detection processor 318 and an amplitude correction processor 320, as shown.

Position detection processor 318 is configured to determine position information of the target based on digital I/Q signals 332, 334. For example, in the case of a rotatable target, position detection processor 318 may calculate the ARCTAN of a vector represented by digital I/Q signals 332, 334 (e.g., vector 338) to determine the target's angle. In some cases, position detection processor 318 may utilize a CORDIC algorithm to calculate target angle from digital I/Q signals 332, 334. Position detection processor 318 can generate, as output, a signal 339 that encodes the target position information. Various output signal formats may be used to encode such information and the structures and techniques sought to be protected herein are not limited by any particular format.

Amplitude correction processor 320 can generate a coil driver control signal 340 which is fed back to coil driver 308 to control (or "tune") the amplitude of the emitted magnetic field 326 such that the amplitude of input signals 328, 330 is substantially equal to the predetermined desired input amplitude.

In some embodiments, amplitude correction processor 320 may estimate amplitude of input signals 328, 330 as the magnitude of the same vector used to determine target position (e.g., vector 338). This single value, derived from the amplitudes of both I/Q input signals, is sometimes referred to as a "complex amplitude." Other techniques may be used to estimate amplitude of input signals 328, 330.

In some embodiments, amplitude correction processor 320 may calculate an error (difference) between the complex amplitude and the predetermined desired input amplitude of the system. This amplitude error may be encoded within coil driver control signal 340 fed back to coil driver 308. For example, coil driver control signal 340 may have a current of voltage level responsive to the amplitude error. In other embodiments, amplitude correction processor 320 may encode the complex amplitude within coil driver control signal 340 and coil driver 308 may use it to compute the amplitude error. In either case, coil driver 308 may use the calculated amplitude error to adjust a reference current/voltage used to control the amplitude of excitation signal 324 and, thus, the magnitude of magnetic field 326. An example of this is described below in the context of FIG. 3A. In some cases, the amplitude error may be calculated and/or used to adjust the magnetic field strength on a continuous (or near-continuous basis). In other cases, these may be done periodically (e.g., every N cycles of a clock with which DSP 316 interfaces).

The desired input amplitude may be fixed within the DSP 316 during manufacture or programmed memory prior to operation. For example, IIC 300 may include or otherwise have access to an EEPROM (electrically erasable programmable read-only memory) 322 in which the desired input amplitude is stored and can be read back during operation. In some cases, the desired input amplitude may be based on the minimum input signal amplitude specified for the IIC's front-end circuitry (i.e., for conditioning circuits 310, 312 and ADC 314). For example, the desired input amplitude may be set to a value greater than or equal to the minimum input signal amplitude.

In some cases, position detection processor 318 may calculate the magnitude of vector 338 for another purpose, such as front-end error detection. Thus, in some embodiments, amplitude correction processor 320 may advantageously reuse this calculated value.

FIG. 3A shows an example of an adaptive coil driver connected to a transmit coil forming an LC tank circuit 350, according to embodiments of the present disclosure. As shown, a coil driver may be realized as an oscillator 352 that generates a sinusoidal signal at a desired carrier frequency. The oscillator can receive, as input, a reference voltage or current 358 used to control the amplitude of current within the tank circuit 350. The TX coil(s) 356 are connected in parallel with the oscillator 352 and one or more capacitors 354 to achieve resonance to maximize efficiency and minimize power consumption.

With conventional coil drivers, the reference voltage/current 358 is fixed during operation. In contrast, an adaptive coil driver according to the present disclosure can adjust the reference voltage based on an error signal 360 having a voltage/current proportional to difference between actual amplitude of IIC input signals and a predetermined desired input amplitude. In some cases, error signal 360 may be generated by IIC receive-side circuitry (e.g., by amplitude correction processor 320 of FIG. 3) and fed back to the coil driver. In other cases, error signal 360 may be generated by IIC transmit-side circuitry (not shown) based on feedback from the receive-side circuitry.

Reference voltage/current 358 may be set to a predetermined value based on the desired input amplitude of the IIC input signals. If the receive-side estimates that input signal amplitude (e.g., complex amplitude) is different from the desired input amplitude, error signal 360 may have a non-zero current/voltage, which is applied by circuit 350 to increase or decrease the reference voltage/current 358 input to oscillator 352. In this way, the strength of the magnetic field emitted by TX coil(s) 356 will be automatically tuned to achieve the desired input amplitude.

FIG. 4 shows an illustrative process 400 for adaptive driving of transmit coils in an inductive sensor, according to some embodiments. At block 402, one or more transmit coils may be excited to generate a magnetic field in the direction of, or at, a target. At block 404, a plurality of input signals (e.g., modulated I/Q signals) can be received via respective ones of a plurality of receive coils. The input signals are responsive to reflections of the magnetic field off the target and encoding information about a position of the target. At block 406, information about the position of the target can be decoded from the input signals. In some cases, the target may be a rotary target and the position information can include angular position. While block 406 is not necessary for adaptive coil driving per se, it may be performed as within an inductive sensor and thus is included here for completeness. In some cases, block 406 may be omitted from process 400. At block 408, an amplitude of the input signals can be calculated. For example, the amplitude may be calculated as a complex amplitude as previously described. In some cases, the complex amplitude may be calculated using a vector that is also used to decode the target position information (block 406). At block 410, a difference between the amplitude of the input signals and a predetermined desired input amplitude can be calculated. The predetermined desired input amplitude may be greater than or equal to a minimum input amplitude of an IIC, for example. At block 412, a strength of the magnetic field can be adjusted based on the calculated difference. In some embodiments, this can include generating an error signal responsive to the calculated difference, wherein the error signal is fed back to a coil driver configured to excite the transmit coils. Process 400 can include various other processing steps/techniques disclosed herein. For example, process 400 may include demodulating, amplifying, and/or filtering the input signals.

As used herein, the terms "processor" and "controller" are used to describe electronic circuitry that performs a function, an operation, or a sequence of operations. The function, operation, or sequence of operations can be hard coded into the electronic circuit or soft coded by way of instructions held in a memory device. The function, operation, or sequence of operations can be performed using digital values or using analog signals. In some embodiments, the processor or controller can be embodied in an application specific integrated circuit (ASIC), which can be an analog ASIC or a digital ASIC, in a microprocessor with associated program memory and/or in a discrete electronic circuit, which can be analog or digital. A processor or controller can contain internal processors or modules that perform portions of the function, operation, or sequence of operations. Similarly, a module can contain internal processors or internal modules that perform portions of the function, operation, or sequence of operations of the module.

As used herein, the term "predetermined," when referring to a value or signal, is used to refer to a value or signal that is set, or fixed, in the factory at the time of manufacture, or by external means, e.g., programming, thereafter. As used herein, the term "determined," when referring to a value or signal, is used to refer to a value or signal that is identified by a circuit during operation, after manufacture.

While electronic circuits shown in figures herein may be shown in the form of analog blocks or digital blocks, it will be understood that the analog blocks can be replaced by digital blocks that perform the same or similar functions and the digital blocks can be replaced by analog blocks that perform the same or similar functions. Analog-to-digital or digital-to-analog conversions may not be explicitly shown in the figures but should be understood.

Various embodiments of the concepts systems and techniques are described herein with reference to the related drawings. Alternative embodiments can be devised without departing from the scope of the described concepts. It is noted that various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship.

In the foregoing detailed description, various features are grouped together in one or more individual embodiments for the purpose of streamlining the disclosure. This method of disclosure is not to be interpreted as reflecting an intention that each claim requires more features than are expressly recited therein. Rather, inventive aspects may lie in less than all features of each disclosed embodiment.

References in the disclosure to "one embodiment," "an embodiment," "some embodiments," or variants of such phrases indicate that the embodiment(s) described can include a particular feature, structure, or characteristic, but every embodiment can include the particular feature, structure, or characteristic. Moreover, such phrases are not necessarily referring to the same embodiment(s). Further, when a particular feature, structure, or characteristic is described in connection knowledge of one skilled in the art to affect such feature, structure, or characteristic in connection with other embodiments whether or not explicitly described.

The disclosed subject matter is not limited in its application to the details of construction and to the arrangements of the components set forth in the following description or illustrated in the drawings. The disclosed subject matter is capable of other embodiments and of being practiced and carried out in various ways. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

All publications and references cited herein are expressly incorporated herein by reference in their entirety.

The invention claimed is:

1. An inductive sensor interface circuit comprising:
   a coil driver configured to excite one or more transmit coils to generate a magnetic field at a target;
   a plurality of input channels for receiving input signals via respective ones of a plurality of receive coils, the input signals responsive to reflections of the magnetic field off the target and encoding information about a position of the target, the plurality of input channels including at least:
      a first input channel for receiving a first input signal, and
      a second input channel for receiving a second input signal out of phase with the first input signal;
   a position detection processor to decode the information about the position of the target from the input signals based on a direction of a vector representing an amplitude of the first input signal and an amplitude of the second input signal; and
   an amplitude detection processor configured to calculate an amplitude of the input signals based on a magnitude of the vector, and to generate a coil driver control signal which is fed back to coil driver to control a strength of the magnetic field generated by the coil driver, the generated coil driver control signal having a level determined at least in part based on a difference between the calculated amplitude to a predetermined desired input amplitude.

2. The circuit of claim 1, wherein the second input signal is 90° out of phase with the first input signal.

3. The circuit of claim 1, wherein the target is a rotary target and the position of the target is an angular position.

4. The circuit of claim 1, wherein at least one of the input channels in the plurality of input channels includes a demodulator for demodulating the respective input signal.

5. The circuit of claim 1, wherein at least one of the input channels in the plurality of input channels includes an amplifier for amplifying the respective input signal.

6. The circuit of claim 1, wherein at least one of the input channels in the plurality of input channels includes a filter for filtering the respective input signal.

7. The circuit of claim 1, wherein the amplitude detection processor is coupled to the coil driver in a feedback loop.

8. The circuit of claim 1 provided as an integrated circuit (IC).

9. The circuit of claim 8, wherein the one or more transmit coils and the one or receive coils are external to the IC.

10. The circuit of claim 1, wherein the amplitude detection processor is configured to control the strength of the magnetic field generated by the coil driver by:

calculating a difference between the calculated amplitude and the predetermined desired input amplitude; and generating an error signal responsive to said difference, wherein the error signal is fed back to the coil driver.

11. The circuit of claim 1, wherein the predetermined desired input amplitude is based on a minimum input signal amplitude of the plurality of input channels.

12. A method comprising:

exciting one or more transmit coils to generate a magnetic field at a target;

receiving a plurality of input signals via respective ones of a plurality of receive coils, the input signals responsive to reflections of the magnetic field off the target and encoding information about a position of the target, the plurality of input signals including at least:

a first input signal received via a first input channel, and a second input signal received via a second input channel, the second input signal out of phase with the first input signal;

decoding the information about the position of the target from the input signals based on a direction of a vector representing an amplitude of the first input signal and an amplitude of the second input signal;

calculating an amplitude of the input signals based on a magnitude of the vector;

calculating a difference between the amplitude of the input signals and a predetermined desired input amplitude;

generating a coil driver control signal having a level determined at least in part by the difference; and adjusting a strength of the magnetic field using the coil driver control signal.

13. The method of claim 12, wherein the second input signal is 90° out of phase with the first input signal.

14. The method of claim 12, wherein the target is a rotary target and the position of the target is an angular position.

15. The method of claim 12, further comprising demodulating, amplifying, and filtering each of the plurality of input signals.

16. The method of claim 12, wherein adjusting the strength of the magnetic field based on the difference includes:

generating an error signal responsive to said difference, wherein the error signal is fed back to a coil driver configured to excite the transmit coils.

17. A system comprising:

a means for exciting one or more transmit coils to generate a magnetic field at a target;

a means for receiving one or more input signals responsive to the magnetic field reflected off the target; and a means for controlling a strength of the magnetic field that amplitude of the one or more input signals is substantially equal to a predetermined desired input amplitude.

* * * * *